US011030651B2

(12) United States Patent
Sheppard et al.

(10) Patent No.: US 11,030,651 B2
(45) Date of Patent: Jun. 8, 2021

(54) SEGMENTED USER PROFILES

(71) Applicant: ADP, LLC, Roseland, NJ (US)

(72) Inventors: Scott Sheppard, Roseland, NJ (US); Sandra Angevine, Pelham, NY (US)

(73) Assignee: ADP, LLC, Roseland, NJ (US)

( * ) Notice: Subject to any disclaimer, the term of this patent is extended or adjusted under 35 U.S.C. 154(b) by 569 days.

(21) Appl. No.: 15/587,550

(22) Filed: May 5, 2017

(65) Prior Publication Data

US 2017/0323334 A1   Nov. 9, 2017

Related U.S. Application Data

(60) Provisional application No. 62/332,539, filed on May 6, 2016.

(51) Int. Cl.
*G06Q 30/02* (2012.01)
*G06Q 10/10* (2012.01)
*G06Q 50/26* (2012.01)

(52) U.S. Cl.
CPC ..... *G06Q 30/0255* (2013.01); *G06Q 10/1057* (2013.01); *G06Q 50/265* (2013.01)

(58) Field of Classification Search
CPC ........... G06Q 30/0255; G06Q 10/1057; G06Q 50/0265
See application file for complete search history.

(56) References Cited

U.S. PATENT DOCUMENTS

| 6,526,404 | B1 * | 2/2003 | Slater ............... G06Q 10/10 707/728 |
| 6,941,291 | B1 | 9/2005 | Zoller et al. |
| 8,370,350 | B2 | 2/2013 | Friedlander et al. |
| 8,417,716 | B2 * | 4/2013 | Andersen ........... G06Q 10/10 707/725 |

(Continued)

FOREIGN PATENT DOCUMENTS

WO   WO0070470 A1   11/2000
WO   WO 2017/208236 A1 *   12/2017   ......... G06F 21/6245

OTHER PUBLICATIONS

Office Action, dated May 16, 2019, regarding USPTO U.S. Appl. No. 15/587,594, 23 pages.

(Continued)

*Primary Examiner* — David J Stoltenberg
(74) *Attorney, Agent, or Firm* — Yee & Associates, P.C.

(57) ABSTRACT

A web page personalization system comprises a profile database and a profile manager. The profile database stores profiles for users. The profiles are comprised of segments of profile information for the users. The profile manager receives a request over an Internet for a group of segments of profile information about a user from a requestor. The request includes an anonymized identifier stored on a device for the user. The profile manager identifies a profile from the profiles for the user in the profile database using the anonymized identifier. The profile is comprised of the segments of the profile information about the user. The profile manager sends a portion of the profile information corresponding (Continued)

to the group of segments in an anonymized form in a reply over the Internet to the requestor. The requestor uses the group of segments to generate a personalized web page for the user.

46 Claims, 9 Drawing Sheets

(56) References Cited

U.S. PATENT DOCUMENTS

| | | | |
|---|---|---|---|
| 8,521,594 B1* | 8/2013 | Skoe | G06Q 30/0269 705/14.66 |
| 8,572,227 B2* | 10/2013 | Toomey | G06Q 10/10 709/223 |
| 8,799,039 B2 | 8/2014 | Cullen, III | |
| 8,909,546 B2 | 12/2014 | Horvits et al. | |
| 9,213,862 B1 | 12/2015 | Spencer et al. | |
| 9,547,660 B2* | 1/2017 | Mayer | H04L 51/046 |
| 9,916,465 B1 | 3/2018 | Erickson et al. | |
| 9,940,634 B1* | 4/2018 | Livhits | G06Q 30/0201 |
| 2001/0034630 A1 | 10/2001 | Mayer et al. | |
| 2002/0049617 A1* | 4/2002 | Lencki | G06Q 30/06 705/4 |
| 2002/0073088 A1 | 6/2002 | Beckmann et al. | |
| 2003/0009385 A1* | 1/2003 | Tucciarone | G06Q 10/107 705/26.1 |
| 2003/0130881 A1* | 7/2003 | Calderaro | G06Q 10/10 705/7.14 |
| 2003/0200142 A1* | 10/2003 | Hicks | G06Q 30/0226 705/14.27 |
| 2004/0143470 A1* | 7/2004 | Myrick | G06Q 30/0205 705/7.36 |
| 2004/0176995 A1* | 9/2004 | Fusz | G06Q 30/02 705/7.32 |
| 2005/0033631 A1* | 2/2005 | Wefers | G06Q 30/0201 705/7.29 |
| 2005/0071680 A1* | 3/2005 | Bukary | G06F 21/6218 726/4 |
| 2005/0119861 A1* | 6/2005 | Bukary | G06Q 30/02 702/186 |
| 2005/0210368 A1* | 9/2005 | Wefers | G06Q 10/06 715/205 |
| 2005/0216479 A1* | 9/2005 | Wefers | G06Q 10/06 |
| 2005/0216480 A1* | 9/2005 | Wefers | G06Q 30/02 |
| 2006/0074920 A1* | 4/2006 | Wefers | G06Q 30/02 |
| 2006/0123462 A1 | 6/2006 | Lunt et al. | |
| 2007/0185721 A1 | 8/2007 | Agassi et al. | |
| 2007/0244734 A1 | 10/2007 | McGovern et al. | |
| 2008/0086402 A1 | 4/2008 | Patel et al. | |
| 2008/0098220 A1* | 4/2008 | Spalink | G06Q 20/383 713/168 |
| 2008/0214310 A1 | 9/2008 | Brunet de Courssou | |
| 2008/0243575 A1* | 10/2008 | Weinberger | G06Q 10/06375 705/7.13 |
| 2008/0262901 A1 | 10/2008 | Banga et al. | |
| 2008/0263633 A1 | 10/2008 | Banga et al. | |
| 2008/0313037 A1* | 12/2008 | Root | H04W 4/02 705/14.53 |
| 2009/0077163 A1* | 3/2009 | Ertugrul | G06Q 30/0273 709/203 |
| 2009/0083290 A1* | 3/2009 | Gailey | G06Q 30/02 |
| 2009/0106105 A1 | 4/2009 | Lewis et al. | |
| 2009/0125377 A1* | 5/2009 | Somji | G06Q 30/02 705/14.49 |
| 2009/0192874 A1 | 7/2009 | Powles et al. | |
| 2009/0227290 A1 | 9/2009 | Chien | |
| 2009/0234686 A1* | 9/2009 | Chakra | G06Q 10/06 705/325 |
| 2009/0299853 A1* | 12/2009 | Jones | G06Q 30/02 705/14.46 |
| 2010/0031335 A1 | 2/2010 | Handler | |
| 2010/0169338 A1 | 7/2010 | Kenedy et al. | |
| 2010/0180009 A1* | 7/2010 | Callahan | G06Q 30/0261 709/217 |
| 2010/0250330 A1 | 9/2010 | Lam et al. | |
| 2010/0312706 A1* | 12/2010 | Combet | G06Q 30/0204 705/50 |
| 2011/0016056 A1* | 1/2011 | Hargroder | G06Q 40/08 705/325 |
| 2011/0016479 A1* | 1/2011 | Tidwell | G06Q 30/02 725/9 |
| 2011/0060905 A1 | 3/2011 | Stack et al. | |
| 2011/0119094 A1* | 5/2011 | Joao | G06Q 10/1057 705/4 |
| 2011/0173077 A1 | 7/2011 | Patel et al. | |
| 2011/0238829 A1* | 9/2011 | Brunell | H04L 61/2539 709/224 |
| 2011/0255688 A1* | 10/2011 | Spalink | H04L 63/0823 380/29 |
| 2011/0307496 A1 | 12/2011 | Jones et al. | |
| 2012/0005213 A1* | 1/2012 | Hannan | G06Q 30/02 707/741 |
| 2012/0022945 A1 | 1/2012 | Falkenborg et al. | |
| 2012/0066084 A1* | 3/2012 | Sneyders | G06Q 30/02 705/26.1 |
| 2012/0078727 A1* | 3/2012 | Lee | G06Q 30/02 705/14.66 |
| 2012/0084151 A1* | 4/2012 | Kozak | G06Q 30/02 705/14.58 |
| 2012/0084349 A1 | 4/2012 | Lee et al. | |
| 2012/0150659 A1 | 6/2012 | Patel et al. | |
| 2012/0198328 A1 | 8/2012 | Kiley et al. | |
| 2012/0271860 A1* | 10/2012 | Graham, Jr. | G06F 16/48 707/798 |
| 2012/0303598 A1 | 11/2012 | Newnham et al. | |
| 2012/0303616 A1* | 11/2012 | Abuelsaad | G06F 21/6254 707/736 |
| 2012/0303621 A1 | 11/2012 | Newnham et al. | |
| 2012/0322429 A1* | 12/2012 | Chien | H04L 63/0407 455/414.1 |
| 2013/0080498 A1 | 3/2013 | deSilva et al. | |
| 2013/0080767 A1* | 3/2013 | Francis | H04M 3/4878 713/154 |
| 2013/0212031 A1 | 8/2013 | Bamfield et al. | |
| 2013/0227707 A1* | 8/2013 | Gay | H04L 63/0421 726/27 |
| 2013/0238447 A1 | 9/2013 | Patel et al. | |
| 2013/0282493 A1* | 10/2013 | Lita | G06F 16/437 705/14.66 |
| 2013/0282733 A1* | 10/2013 | Tawakol | G06Q 30/02 707/748 |
| 2013/0304721 A1 | 11/2013 | Fakeih | |
| 2013/0346264 A1 | 12/2013 | Falkenborg et al. | |
| 2014/0012683 A1 | 1/2014 | Patel et al. | |
| 2014/0019542 A1 | 1/2014 | Rao et al. | |
| 2014/0040044 A1 | 2/2014 | Patel et al. | |
| 2014/0129469 A1* | 5/2014 | Vianello | G06Q 10/1053 705/321 |
| 2014/0149384 A1* | 5/2014 | Krishna | G06F 16/437 707/711 |
| 2014/0180948 A1 | 6/2014 | McGovern et al. | |
| 2014/0201007 A1 | 7/2014 | Stack et al. | |
| 2014/0201202 A1* | 7/2014 | Jones | G06F 16/24578 707/723 |
| 2014/0250145 A1 | 9/2014 | Jones et al. | |
| 2014/0283097 A1* | 9/2014 | Allen | G06F 21/6254 726/26 |
| 2014/0351051 A1* | 11/2014 | Root | G06F 16/955 705/14.57 |
| 2015/0006400 A1* | 1/2015 | Eng | H04L 9/0631 705/51 |
| 2015/0089622 A1* | 3/2015 | Sondhi | H04L 63/0853 726/9 |
| 2015/0127565 A1 | 5/2015 | Chevalier et al. | |
| 2015/0128285 A1* | 5/2015 | LaFever | H04L 63/0407 726/26 |
| 2015/0128287 A1 | 5/2015 | LaFever et al. | |
| 2015/0149443 A1 | 5/2015 | Aravamudan et al. | |

(56) References Cited

U.S. PATENT DOCUMENTS

| | | | |
|---|---|---|---|
| 2015/0193719 A1* | 7/2015 | Than | G06Q 10/105 705/7.39 |
| 2015/0262246 A1 | 9/2015 | Stack et al. | |
| 2015/0286645 A1* | 10/2015 | Sinha | G06F 16/9535 707/734 |
| 2015/0287092 A1 | 10/2015 | Samadani et al. | |
| 2015/0289100 A1* | 10/2015 | Stringer, II | H04W 4/021 455/456.3 |
| 2015/0355912 A1* | 12/2015 | Kane | G06F 3/041 718/100 |
| 2015/0379303 A1* | 12/2015 | LaFever | G06F 21/6254 726/28 |
| 2016/0048698 A1 | 2/2016 | Sahu et al. | |
| 2016/0086222 A1 | 3/2016 | Kurapati | |
| 2016/0125200 A1* | 5/2016 | York | H04L 63/107 726/1 |
| 2016/0164876 A1 | 6/2016 | Handler | |
| 2016/0217461 A1* | 7/2016 | Gaddam | G06Q 20/383 |
| 2016/0275545 A1* | 9/2016 | Dasdan | G06Q 30/0244 |
| 2016/0328749 A1* | 11/2016 | Root | G06Q 30/0267 |
| 2017/0011413 A1 | 1/2017 | Treiser | |
| 2017/0017991 A1* | 1/2017 | Cochrane | G06Q 30/0245 |
| 2017/0075965 A1* | 3/2017 | Liu | G06F 16/27 |
| 2017/0098093 A1* | 4/2017 | Koo | G06F 21/6209 |
| 2017/0147982 A1 | 5/2017 | Reich et al. | |
| 2017/0200196 A1* | 7/2017 | Hartzell | G06Q 30/0205 |
| 2017/0262885 A1 | 9/2017 | Fuentes et al. | |
| 2017/0272336 A1* | 9/2017 | Johnstone | H04L 43/04 |
| 2017/0287044 A1 | 10/2017 | Rose et al. | |
| 2017/0316424 A1* | 11/2017 | Messana | G16H 40/20 |
| 2017/0323346 A1 | 11/2017 | Sheppard et al. | |
| 2017/0324831 A1* | 11/2017 | Renschler | G06F 21/10 |
| 2017/0364698 A1 | 12/2017 | Goldfarb et al. | |
| 2018/0089676 A1 | 3/2018 | Narashimhan et al. | |
| 2018/0144036 A1* | 5/2018 | Kramer | G06F 21/6254 |
| 2018/0196954 A1 | 7/2018 | Erickson et al. | |

OTHER PUBLICATIONS

"Understanding Online Advertising, How Does It Work?" Network Advertising Initiative, copyright 2015, 3 pages, accessed Mar. 8, 2016. http://www.networkadvertising.org/understanding-online-advertising/how-does-it-work.

"Its Time to Rethink Payroll, We'll Keep You Compliant & Efficient," Payroll Vault, Jun. 2015, 7 pages, accessed Mar. 8, 2016. https://www.payrollvault.com/privacy-policy/.

Sheppard et al., "Segmented Advertising Database System," USPTO U.S. Appl. No. 15/587,594, filed May 5, 2017, 74 pages.

Office Action dated Apr. 1, 2020, regarding U.S. Appl. No. 15/587,594, 23 pages.

Final Office Action, dated Oct. 23, 2019, regarding USPTO U.S. Appl. No. 15/587,594, 29 pages.

Final Office Action, dated Aug. 31, 2020, regarding USPTO U.S. Appl. No. 15/587,594, 37 pages.

\* cited by examiner ial Patent Application Ser. No. 62/332,539, filed May 6, 2016, and entitled "Segmented User Profiles."

SEGMENTED USER PROFILES

RELATED PROVISIONAL APPLICATION

This application claims the benefit of U.S. Provisional Patent Application Ser. No. 62/332,539, filed May 6, 2016, and entitled "Segmented User Profiles."

CROSS-REFERENCE TO RELATED APPLICATION

This application is related to the following patent application, entitled "Segmented Advertising Database System", U.S. Ser. No. 15/587,594, filed even date herewith, which is incorporated herein by reference in its entirety.

BACKGROUND INFORMATION

1. Field

The present disclosure relates generally to an improved computer system and, in particular, to a method and apparatus for generating advertisements for web pages. Still more particularly, the present disclosure relates to a method and apparatus for creating web pages with advertisements targeted to users using segmented user profiles that are anonymized.

2. Background

The Internet is a global system of interconnected computer networks that link computers and other data processing systems worldwide. The connections are made through an array of electronic, wireless, and optical networking technologies. The Internet provides an extensive range of information and services.

The Internet is used to perform a variety of activities. For example, users employ the Internet to read articles, watch news reports, listen to music, send messages, perform research, play online games, perform banking transactions, purchase products and services, pay bills, talk to other people using voice communications, and perform other activities over the Internet.

For example, users may access information in documents or in other forms on the World Wide Web. The World Wide Web, which is also referred to just as the Web, is an open source information space accessed through the Internet. Users typically access web pages. Web pages are primarily text documents that are formatted in a markup language, such as hypertext markup language (HTML). In addition to the formatted text, the web pages may also include images, video, software components, or other elements that are presented through a web browser. The presentation may be a display of information, an audio presentation, a multimedia presentation, or some combination thereof.

An organization, such as a company, a partnership, a charity, an educational group, a social group, a team, a city, a government agency, or some other suitable organization, may establish a presence on the Web using a website. Some organizations may perform various transactions using a website. For example, a business may offer goods or services to users through a website.

With the vast number of businesses that offer goods or services over the Web, identifying which businesses have good customer service, are reputable, or have other characteristics that are desirable in making purchases may be harder to identify than desired.

These different businesses often advertise over various types of media. For example, many businesses use online advertising. Online advertising includes e-mail marketing, search engine marketing, social media marketing, mobile advertising, and other various types of display advertising on web browsers. Advertisements may be integrated into content in web pages requested by users. These advertisements may be in the form of banners, floating ads, newsfeed ads, and other types of advertisements that users may view while online on the Internet.

A website may target advertising to users who visit the website. For example, cookies, pixel tags, text files, device identifiers, or other techniques for uniquely identifying visitors to websites are used to identify and collect information about the users.

These identifiers are used to identify a user that visits a website and to associate activities of the user at the website with the user. The activities may be used to place the user into categories or groups based on the activities tracked during visits to the websites.

For example, a user may look at sport cars on the websites. Viewing sports cars on the websites may be used to place the user into a category such as sports cars. Also, the activities of the user on the websites may be used to place the user into other categories, such as gender and age group, which may be identified. Further, geographic location may be identified from the Internet Protocol (IP) address of the device and global positioning system (GPS) information from the device in addition to activities of the user.

This information about the user is placed into advertising databases in association with a unique identifier for the user without actually identifying the user. The information is collected and maintained by a website publisher, an advertiser of an item, a third party advertising company, or some combination thereof.

When the user visits a website, the unique identifier is used to obtain the information collected about the user. This information is used to select one or more advertisements that are placed into a web page sent to a browser or content that is sent to an application on the device when the user visits the website.

In many cases, the association of the information is based on the activities of the users at different websites. The activities, however, may not always provide for an accurate identification of the information about the users. For example, a user searching a website for men's shirts commonly worn by men in the age group of 25-34 years may not be a male that is in the age group of 25-34 years. Instead, the user may be a woman in the age group of 50-55 years who is searching for a gift for her son-in-law. As a result, targeting advertisements based on the age group of 25-34 years may not generate the desired results.

Further, the information collected from the activities of the users may not be useful to all advertisers for items. For example, age groups and clothing preferences of users are not very useful to a car company that advertises a sports car.

Therefore, it would be desirable to have a method and apparatus that take into account at least some of the issues discussed above, as well as other possible issues. For example, it would be desirable to have a method and apparatus that overcome a technical problem with obtaining useable information about users for use in selecting advisements for the users visiting websites.

SUMMARY

An embodiment of the present disclosure provides a method for managing profile information. A computer system receives a request for user profile information related to a group of segments in the request from a requestor. The computer system identifies a profile for the user in a user profile database based on an anonymized identifier for a user. The profile is comprised of user profile information about the user. The computer system sends a portion of the user profile information corresponding to the group of segments in a reply to the requestor.

Another embodiment of the present disclosure provides a web page personalization system. The web page personalization system comprises a profile database and a profile manager. The profile database is configured to store profiles for users, wherein the profiles are comprised of segments of profile information for the users. The profile manager is configured to receive a request over an Internet for a group of segments of profile information about a user in the users from a requestor in which the request includes an anonymized identifier stored on a device for the user. A profile from the profiles is identified for the user in the profile database using the anonymized identifier in which the profile is comprised of the segments of the profile information about the user. A portion of the profile information about the user corresponding to the group of segments is sent in an anonymized form in a reply over the Internet to the requestor, wherein the requestor uses the group of segments to generate a personalized web page for the user.

Yet another embodiment of the present disclosure provides a method for personalizing a web page. An anonymized identifier is stored on a device for a user by a computer system. The anonymized identifier is linked to a profile for the user in a profile database by the computer system, wherein the profile is comprised of segments of profile information about the user. A request is received for a group of the segments of the profile information about the user by the computer system. A reply is sent by the computer system to the requestor in which the reply includes a portion of segments of the profile information about the user in a form of anonymized profile information.

Yet another embodiment of the present disclosure provides a method for managing human resources profile information. A request for user profile information related to a group of segments based on an anonymized identifier for a user from a requestor is received by a computer system. A profile for the user in a profile database is identified by the computer system, wherein the profile is comprised of the segments of the human resources profile information about the user. A portion of the human resources profile information corresponding to the group of segments in a reply to the requestor is sent by the computer system.

Another embodiment of the present disclosure provides for a method for generating an advertisement. The method comprises a computer system requesting human resources profile information for a group of segments for the user. The computer system receives the human resources profile information in a reply. The computer system generates the advertisement for transmission to a device for the user.

Still another embodiment of the present disclosure provides an advertising system that comprises a profile database and a profile manager. The profile database is configured to store human resource profiles for users, wherein the human resource profiles are segmented. The profile manager is configured to receive a request for a group of segments of human resources profile information for a user from a requestor. Further, the profile manager identifies a profile from the profiles for the user in the profile database, wherein the profile is comprised of the segments of the human resources profile information about the user. Yet further, the profile manager sends a portion of the human resources profile information corresponding to the group of segments in a reply to the requestor.

Yet another embodiment of the present disclosure provides a computer program product for managing human resources profile information that comprises a computer readable storage media. The computer program product also comprises first program code, second program code, third program code, and fourth program code, which are all stored on the computer on the computer-readable storage media. The first program code receives a request for a group of segments of the human resources profile information for a user from a requestor. The second program code identifies a profile for the user in a profile database, wherein the profile is comprised of the segments of the human resources profile information about the user. The third program code sends a portion of the human resources profile information corresponding to the group of segments in a reply to the requestor. The fourth program code identifies the portion of the human resources profile information corresponding to the group of segments using a policy.

Still another embodiment of the present disclosure provides for an advertising system. The advertising system comprises a profile database and a profile manager. The profile database is configured to store profiles for users, wherein the profiles are segmented. The profile manager is configured to receive a request for a group of segments of profile information for a user from a requestor. The profile manager identifies a profile from the profile for the user in the profile database, wherein the profile is comprised of the segments of information about the user. The profile manager sends a portion of the information corresponding to the group of segments in a reply to the requestor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, in addition to accuracy of information, the illustrative embodiments recognize and take into account that the amount of information received for selecting advertisements may be more than desired. The illustrative embodiments also recognize and take into account that the amount of detail of information also may vary depending on what item is being advertised.

An item may take different forms. For example, an item is selected from one of a product, a service, an entity, a person, an organization, a company, a partnership, a charity, an educational group, a social group, a team, a city, a government agency, a theme park, a restaurant, or some other suitable item that may be advertised.

Thus, the illustrative embodiments provide a method and apparatus for managing human resource profile information. In one illustrative example, a process receives a request for a group of segments of the human resources profile information for a user from a requestor. A profile for the user is identified in a profile database. The profile is comprised of the segments of the human resources profile information about the user. A portion of the human resources profile information corresponding to the group of segments is sent in a reply to the requestor. The portion of the human resources profile information is used to generate an advertisement that is placed into a web page or content for the user, enabling receiving the information requested and reducing the amount of processing resources by not requesting information that is not needed by the requestor.

Figure 1:
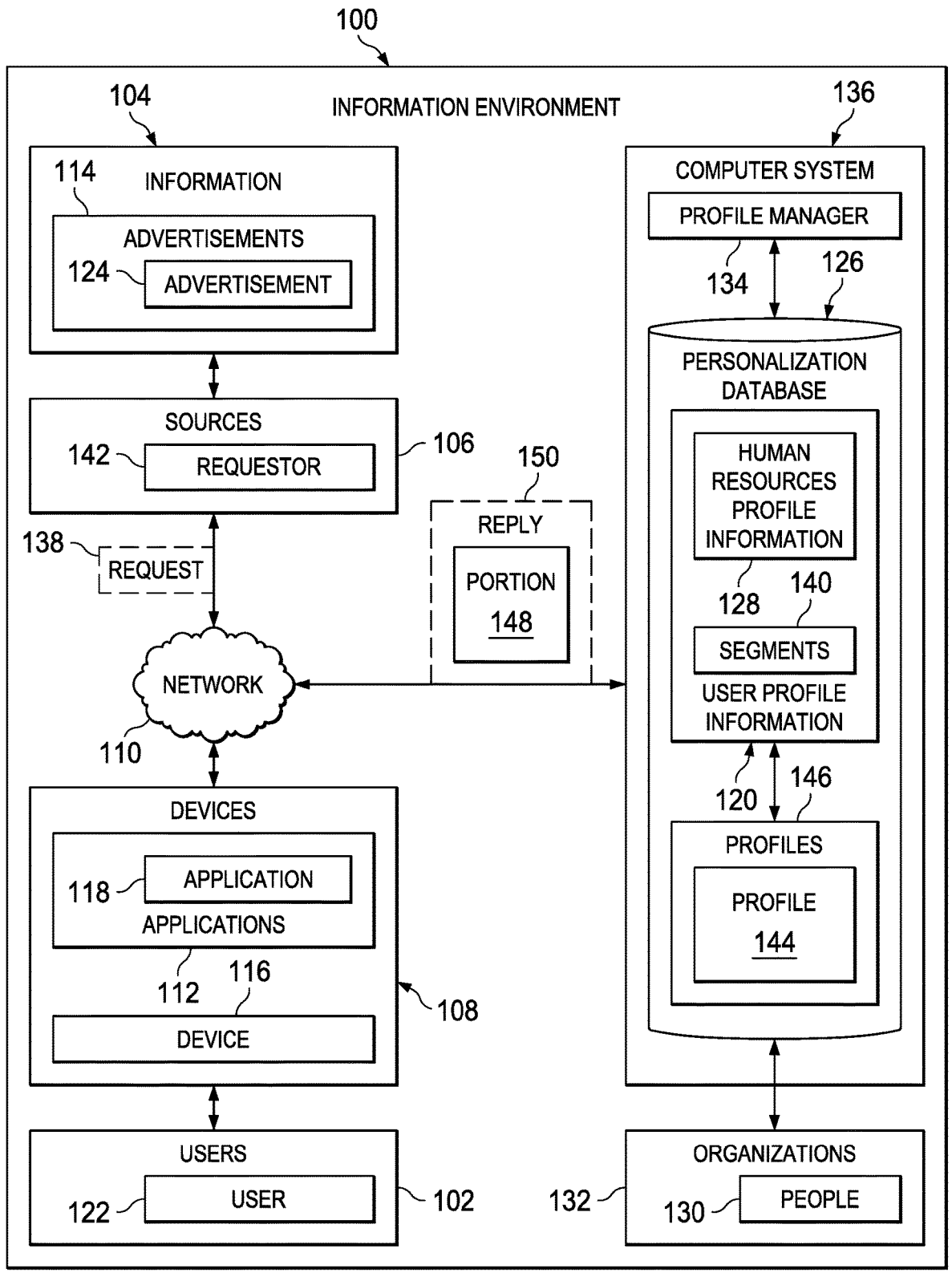
FIG. 1 is an illustration of an advertising environment in accordance with an illustrative embodiment.

With reference now to the figures and, in particular, with reference to FIG. 1, an illustration of an advertising environment is depicted in accordance with an illustrative embodiment. In this depicted example, information environment 100 includes users 102 who may search for and request information 104 from sources 106 while operating devices 108. In this illustrative example, users 102 are people.

Sources 106 comprise physical hardware and may include at least one of server computers, web servers, proxy servers, file transfer protocol servers, work stations, personal computers, laptop computers, tablets, mobile phones, or any other type of data processing system that may store information 104.

Devices 108 are physical hardware in the form of data processing systems. As depicted, devices 108 may be selected from at least one of a computer, a laptop computer, a tablet, a mobile phone, or some other suitable type of device that may process information 104.

As depicted, devices 108 and sources 106 communicate with each other over network 110. Network 110 is a communications medium and may include at least one of a local area network, a wide area network, an Internet, an intranet, or other suitable types of networks.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, sources 106 send information 104 to applications 112 running on devices 108. Applications 112 may include at least one of a browser, a mobile application, or some other suitable type of application that is configured to receive information 104.

In this example, information 104 also includes advertisements 114 that may be sent to applications 112. User profile information 120 is used to manage advertisements 114.

Managing advertisements 114 includes generating and storing advertisements 114. Generating advertisements 114 includes selecting existing ones of advertisements 114. Generating advertisements 114 also includes generating advertisements 114 as needed if desired advertisements are not already present in advertisements 114. For example, advertisement 124 in advertisements 114 may be dynamically generated to target user 122 in users 102. In particular, advertisement 124 is received by application 118 in applications 112 that runs on device 116 for user 122.

User profile information 120 is information about users 102 and is stored in personalization database 126. Personalization database 126 is an organized collection of user profile information 120. In other words, personalization database 126 comprises user profile information 120 and the way user profile information 120 is organized. In this example, user profile information 120 includes human resources profile information 128.

Human resources profile information 128 includes information about people 130 in a group of organizations 132. As used herein, "a group of", when used with reference to items, means one or more items. For example, "a group of organizations 132" is one or more of organizations 132. When the group of organizations 132 is a company with people 130 in the form of employees, human resources profile information 128 is information about the employees. For example, the information may be information about payroll, benefits, retirement, or other information about the employees.

Human resources profile information 128 is used to perform operations with respect to people 130. As depicted, human resources profile information 128 is at least one of more detailed or accurate as compared to current sources of information for advertisements 114 using information about users 102 collected or mined for monitoring activities of users 102.

The information is often verified or input by people 130. For example, human resources profile information 128 may be identified for inclusion in user profile information 120 in personalization database 126 from application 118 on device 116 used by user 122 in which application 118 is selected from one of a payroll application and a benefits application.

For example, user 122 may enter information such as name, address, age, and other suitable information about user 122 using application 118. In another illustrative example, user 122 may enter information about other ones of users 102 using application 118.

As a result, user 122 may enter human resources profile information 128 about user 122 or others in users 102 or people 130 as part of a human resources operation. Human resources profile information 128 may be selected from at least one of payroll, insurance, employee benefits, reviews, or other information about people 130 in the group of organizations 132.

As depicted, profile manager 134 manages user profile information 120. The management of user profile information 120 includes as least one of reading, writing, deleting, or other operations with respect to user profile information 120.

Profile manager 134 may be implemented in software, hardware, firmware or a combination thereof. When software is used, the operations performed by profile manager 134 may be implemented in program code configured to run on hardware, such as a processor unit. When firmware is used, the operations performed by profile manager 134 may be implemented in program code and data and stored in persistent memory to run on a processor unit. When hardware is employed, the hardware may include circuits that operate to perform the operations in profile manager 134.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, profile manager 134 is located in computer system 136. Computer system 136 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Profile manager 134 is configured to receive request 138 for a group of segments 140 of user profile information 120 about user 122 from requestor 142. The group of segments 140 may be some or all of segments 140 of user profile information 120 about user 122.

As depicted, request 138 is sent through network 110. Profile manager 134 identifies profile 144 about user 122 from profiles 146 in personalization database 126. Profile 144 is comprised of segments 140 of user profile information 120 about user 122. Profile manager 134 identifies and sends portion 148 of user profile information 120 in profile 144 corresponding to the group of segments 140 in reply 150 to requestor 142 in sources 106. In this example, reply 150 is sent to requestor 142 through network 110.

Segments 140 are categories or bins in which user profile information 120 may be sorted by or in which user profile information 120 may be placed. In this illustrative example, a segment in segments 140 may be selected from one of a work location, a residence location, an age group, a gender, a job, an education, a health history, a title, an industry, a hobby, a type of insurance, a salary, or some other suitable type of information.

In the illustrative examples, requestor 142 may be part of sources 106 or may be a separate entity that communicates with sources 106 to manage advertisements 114. For example, requestor 142 may be a Web server, an advertisement distribution server, or some other type of hardware system that manages or aids in the management of advertisements 114. Requestor 142 may be operated by one of a website operator, an advertiser, a third party advertiser, or some other type of organization.

In one illustrative example, one or more technical solutions are present that overcome a technical problem with obtaining useable information about users for use in generating advisements for the users visiting websites. As a result, one or more technical solutions may provide a technical effect providing a desired amount of information about users 102 for sending advertisements 114 to users 102 in web pages or other content.

As a result, computer system 136 operates as a special purpose computer system in which profile manager 134 in computer system 136 enables sending user profile information 120 for use in targeting advertisements 114 to users 102, but in a fashion that is anonymized from the form in user profile information 120 and, in particular, when user profile information 120 is human resources profile information 128.

As depicted, anonymization of user profile information 120 involves removing or changing user profile information 120 to remove personally identifiable information about users 102. For example, user profile information 120 is sent in a manner such that users 102 cannot be identified from user profile information 120 that is sent for use in generating advertisements 114. Targeting advertisements 114 to users 102 means that advertisements 114 are generated for users 102 in a manner that is intended to obtain attention or persuade users 102 to purchase goods or services.

In this manner, current repositories of human resources profile information 128 may be leveraged and used in targeting advertisements 114 when using profile manager 134. In particular, profile manager 134 transforms computer system 136 into a special purpose computer system as compared to currently available general computer systems that do not have profile manager 134.

Figure 2:
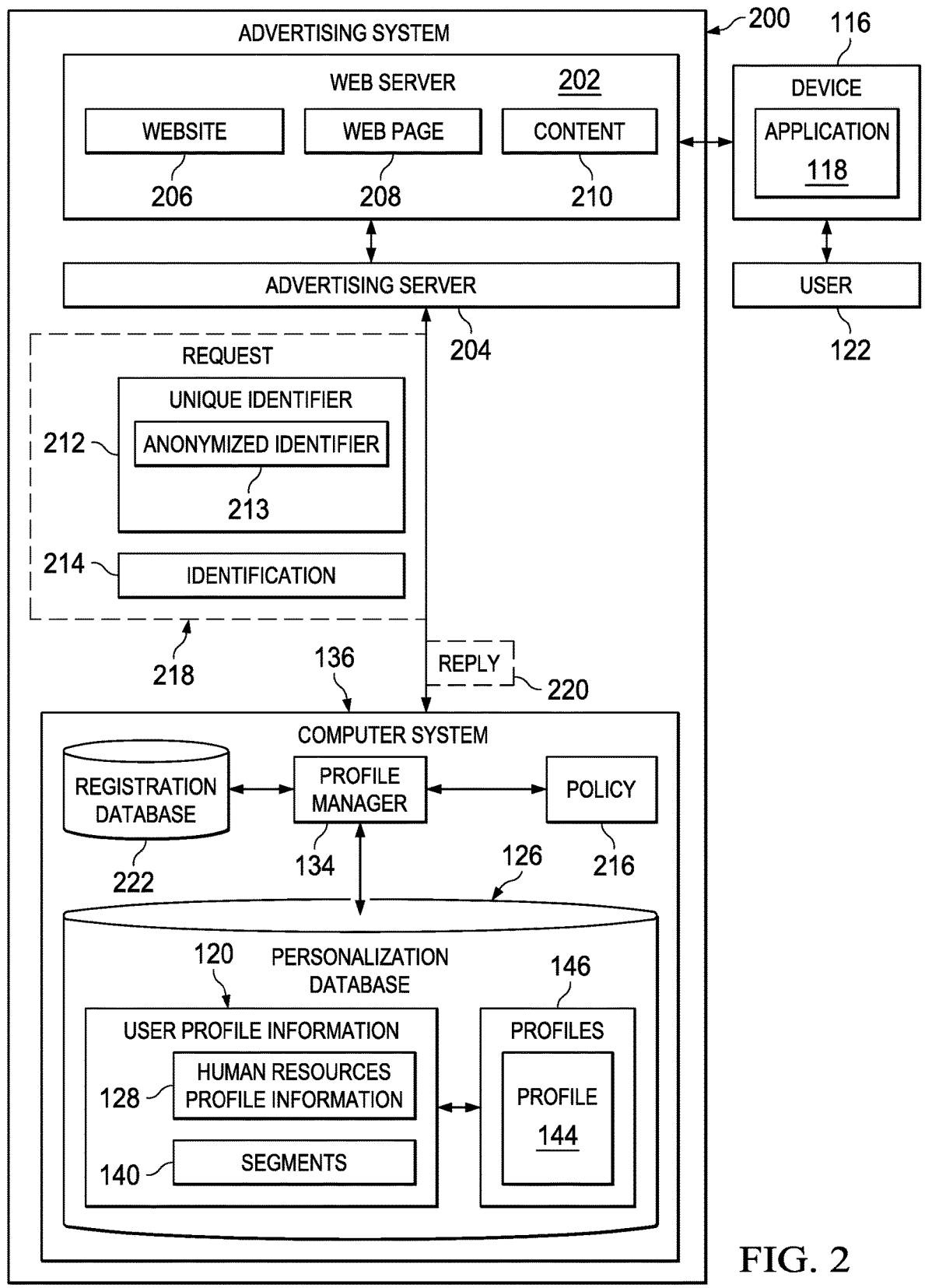
FIG. 2 is a block diagram of an advertising system in accordance with an illustrative embodiment.

Turning next to FIG. 2, a block diagram of an advertising system is depicted in accordance with an illustrative embodiment. In the illustrative examples, the same reference numeral may be used in more than one figure. This reuse of a reference numeral in different figures represents the same element in the different figures. Advertising system 200 may be implemented in information environment 100 in FIG. 1 using one or more components in information environment 100.

In this illustrative example, advertising system 200 includes web server 202, advertising server 204, and profile manager 134. As depicted, web server 202 is an example of a source in sources 106 in FIG. 1. In this illustrative example, advertising server 204 is an example of requestor 142 in FIG. 1 and may be a source in sources 106.

During operation of advertising system 200, web server 202 sends at least one of web page 208 or content 210 in information 104 in FIG. 1 to user 122 when user 122 visits website 206 hosted by web server 202. Information 104 is sent to application 118 running on device 116 operated or owned by user 122.

As depicted, web page 208 is stored by web server 202 for distribution. Web page 208 also may be dynamically generated when requested by user 122 visiting website 206. Web page 208 is sent to application 118 when application 118 is a browser or a browser-enabled application.

As depicted, content 210 may be used to generate web page 208. Further, content 210 may be sent to application 118 when a link or links are selected in web page 208. Those links may be for content 210 located on web server 224 or from other web servers or sources 106 in FIG. 1.

In the illustrative example, content 210 also is stored by web server 202. Content 210 may be sent directly to application 118 running on device 116 when application 118 takes other forms other than a browser or a web-enabled application that processes web page 208.

As depicted, content 210 take various forms. For example, content 210 may be selected from at least one of a video, images, audio files, documents, spreadsheets or other types of content.

Further, web server 202 sends advertisements 114 in FIG. 1 to user 122. Advertisements 114 are placed into web page 208 or included in content 210 and sent to application 118.

In this depicted example, web server 202 identifies user 122 when user 122 visits website 206. This identification is made by web server 202 using unique identifier 212 stored on device 116.

Unique identifier 212 may take a number of different forms. For example, unique identifier 212 may be a cookie, a pixel tag, a text file, a device identifier, or some other suitable mechanism currently used to identify users visiting websites. A device identifier may be, for example, a unique identifier for a processor unit, a media access control (MAC) address, or some other identifier based on hardware. The device identifier may be assigned to and stored on device 116. In these illustrative examples, unique identifier 212 is anonymized identifier 213 such that the name of user 122 cannot be identified.

This identification is often anonymous without identifying the name of the user. For example, the identification may only be unique identifier 212. In other examples, the identification may include a name of user 122 if user 122 logs into an account at website 206. In this case, unique identifier 212 may be at least one of the name of the user, a unique alphanumeric string, a number, or some other suitable form of identification.

As depicted, web server 202 identifies unique identifier 212 for user 122 and sends unique identifier 212 to advertising server 204. Advertising server 204 is an example of an implementation for requestor 142 in FIG. 1. Advertising server 204 identifies a group of segments 140 of human resources profile information 128 for which advertising server 204 wants to receive for use in including advertisement 124 in FIG. 1 in web page 208. Advertising server 204 uses profile manager 134 to make this identification of the group of segments 140.

As depicted, advertising server 204 sends unique identifier 212 for user 122 and identification 214 of the group of segments 140 in request 218 to profile manager 134. In this example, the group of segments 140 is one or more of segments 140 that are desired for use in generating advertisement 124.

In response to receiving request 218, profile manager 134 identifies profile 144 in profiles 146 for user 122. In this example, the identity of user 122 is identified from unique identifier 212. With the identification of user 122, profile 144 in human resources profile information 128 for user 122 may be identified.

For example, application 118 may have unique identifier 212 that is registered in human resources profile information 128. As another example, device 116 may have unique identifier 212 that is registered for user 122 with profile manager 134. In other words, web server 202 and advertising server 204 do not know the actual identity of user 122. Profile manager 134 is configured to derive the actual identity of user 122 to identify profile 144 for user 122 in human resources profile information 128.

As depicted, profile manager 134 uses registration database 222 to identify profile 144 for user 122. Profile manager 134 uses unique identifier 212 to query registration database 222 to identify profile 144 for user 122.

In this illustrative example, profile 144 includes segments 140 of human resources profile information 128 about user 122. Profile manager 134 identifies portion 148 of human resources profile information 128 in profile 144 for the group of the segments 140 of human resources profile information 128 about user 122 that corresponds to identification 214 in request 218. In this manner, the identity of user 122 may remain anonymous with respect to web server 202 and advertising server 204.

Profile manager 134 identifies portion 148 in FIG. 1 of human resources profile information 128 corresponding to the group of segments 140 using policy 216. Policy 216 is one or more rules that are used to identify portion 148. Policy 216 may also include data used in applying the rules.

As depicted, policy 216 is used by profile manager 134 to perform one or more operations on human resources profile information 128 to obtain portion 148 corresponding to the group of segments 140. For example, profile manager 134 may perform at least one of selecting, modifying, filtering, or some other selected operation on human resources profile information 128 to generate portion 148.

For example, profile manager 134 may identify a level of detail for human resources profile information 128 corresponding to the group of segments 140 using policy 216 to form portion 148 of human resources profile information 128.

In one example, human resources profile information 128 about user 122 in profile 144 includes a salary for user 122 and a segment in segments 140 requested by identification 214 in request 218 is a salary.

Policy 216 may include a rule that returns salary information in a salary range. Application of policy 216 results in a salary range being included in portion 148 returned in reply 220 rather than the actual salary.

As another example, the level of detail may also depend on permissions given by users 102 in FIG. 1. Policy 216 may also have a rule that includes checking permissions from users 102. For example, a segment for a salary may result in a salary range being returned for a first user in users 102 and no salary range or other information for a second user in users 102.

As yet another example, user 122 is employed at Company X. Based on policy 216, Company X or an industry for Company X may be returned.

The selection of the level of detail is based on a number of different factors in policy 216. The factors include at least one of privacy, a fee paid by an advertiser, or other suitable factors. For example, an increased level of detail may be present depending on the fee paid by the advertiser.

Additionally, the amount of specificity also may be based on permissions from user 122 that take into account privacy, a feed paid to user 122, or other factors. Thus, identifying human resources profile information 128 may be identified based on permissions from user 122. For example, a permission may be set such that some or all of human resources profile information 128 about user 122 is omitted or available to advertisers requesting human resources profile information 128 about user 122. For example, the permissions may be set such that use of human resources profile information 128 about user 122 is prohibited until user 122 agrees to the use.

Profile manager 134 returns portion 148 of human resources profile information 128 corresponding to the group of segments 140 requested by advertising server 204 in reply 220. In response to receiving reply 220, advertising server 204 generates advertisement 124 in FIG. 1 for inclusion in web page 208.

Advertising server 204 sends send advertisement 124 to web server 202. Advertisement 124 includes at least one of graphics, images, video, audio, scripts, universal resource locators (URLs), or other suitable types of content 210.

As depicted, advertising server 204 may generate advertisement 124 by selecting advertisement 124 from a database of advertisements 114 in FIG. 1 using portion 148 in FIG. 1 of human resources profile information 128 about user 122 from profile 144 returned in reply 220. Alternatively, advertising server 204 may dynamically generate advertisement 124 in selecting advertisement 124.

In other illustrative examples, advertising server 204 may send a selection of advertisements 114 to web server 202 when advertisement 124 is stored on web server 202.

In this manner, at least one of web page 208 or content 210 is personalized for user 122. This personalization provides a unique web page 208 or content 210 that is displayed to user 122 on device 116. More specifically, advertisement 124 is sent to device 116 for user 122 in a manner that is more likely to generate interest by user 122 as compared to more general advertising. Further, with the use of human resources profile information 128, more specific generation of advertisement 124 may be made.

Further, the illustrative embodiments also recognize and take into account that another technical problem is the amount of information that is transmitted within advertising system 200 to identify advertisements 114 for inclusion in web pages or other content. Those illustrative embodiments also recognize and take into account that transmitting information about users 102 from advertising databases may use large amounts of bandwidth in network 110 in FIG. 1 depending on the number of users 102 that are actively searching for information 104 in FIG. 1.

The illustrative examples provide one or more technical solutions in which only some of human resources profile information 128 may be transmitted from profile manager 134 to advertising server 204. In this manner, transmitting only some of human resources profile information 128 corresponding to the group of segments 140 in FIG. 1 requested by advertising server 204 reduces the amount of information that is transmitted. In this manner, transmitting information may be reduced in a manner that provides for at least one of a response time, bandwidth use, cost, or other factors that may meet a desired metric or level of use.

Figure 3:
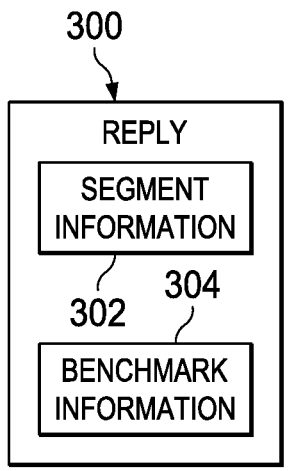
FIG. 3 is an illustration of a reply in accordance with an illustrative embodiment.

With reference now to FIG. 3, an illustration of a reply is depicted in accordance with an illustrative embodiment. In this figure, an example of information in a reply sent in response to a request for human resources profile information 128 about user 122 is shown. Reply 300 is an example of reply 150 in FIG. 1 or reply 220 in FIG. 2.

As depicted, reply 300 includes segment information 302 and benchmark information 304. Segment information 302 includes information in human resources profile information 128 that is based on the group of segments 140 in profile 144 for user 122.

Segment information 302 is comprised of at least one of human resources profile information 128 corresponding to the group of segments 140 or information derived from human resources profile information 128. Policy 216, as described above, may be used by profile manager 134 to derive segment information 302 from human resources profile information 128. For example, some or all of human resources profile information 128 that corresponds to the group of segments 140 may be filtered, modified, anonymized, or otherwise changed to form segment information 302.

Benchmark information 304 is a group of benchmarks. Profile manager 134 identifies a group of benchmarks for the group of segments 140 as part of human resources profile information 128 corresponding to the group of segments 140. One or more benchmarks may be identified for each segment in the group of segments 140.

Figure 4:
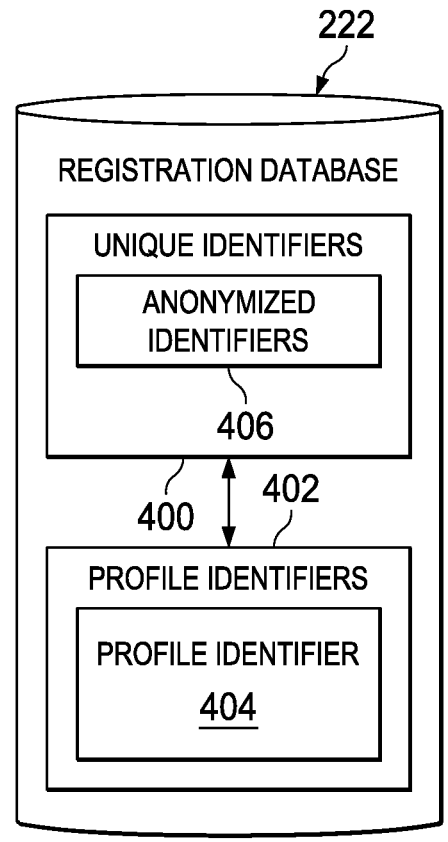
FIG. 4 is an illustration of a registration database in accordance with an illustrative embodiment.

With reference next to FIG. 4, an illustration of a registration database is depicted in accordance with an illustrative embodiment. In this figure, an example of an implementation for registration database 222 is shown. As depicted, registration database 222 includes unique identifiers 400 and profile identifiers 402.

Registration database 222 maps unique identifiers 400 to profile identifiers 402. For example, unique identifier 212 in FIG. 2 may be used as a key to find a record or a row in a table with profile identifier 404 in profile identifiers 402 for profile 144 for user 122. The data structures used depends on the structure and organization of registration database 222.

In the illustrative example, unique identifiers 400 are anonymized identifiers 406 such that the identities of users 102 in FIG. 1 may remain anonymous. As depicted, anonymized identifiers 406 cannot be used to identify the names of users 102.

Profile identifiers 402 may take different forms. For example, profile identifiers 402 may be selected from at least one of a first name and a last name, a Social Security number, a record identifier, or some other suitable identifier that is used to locate profile 144 for user 122 in personalization database 126.

Figure 5:
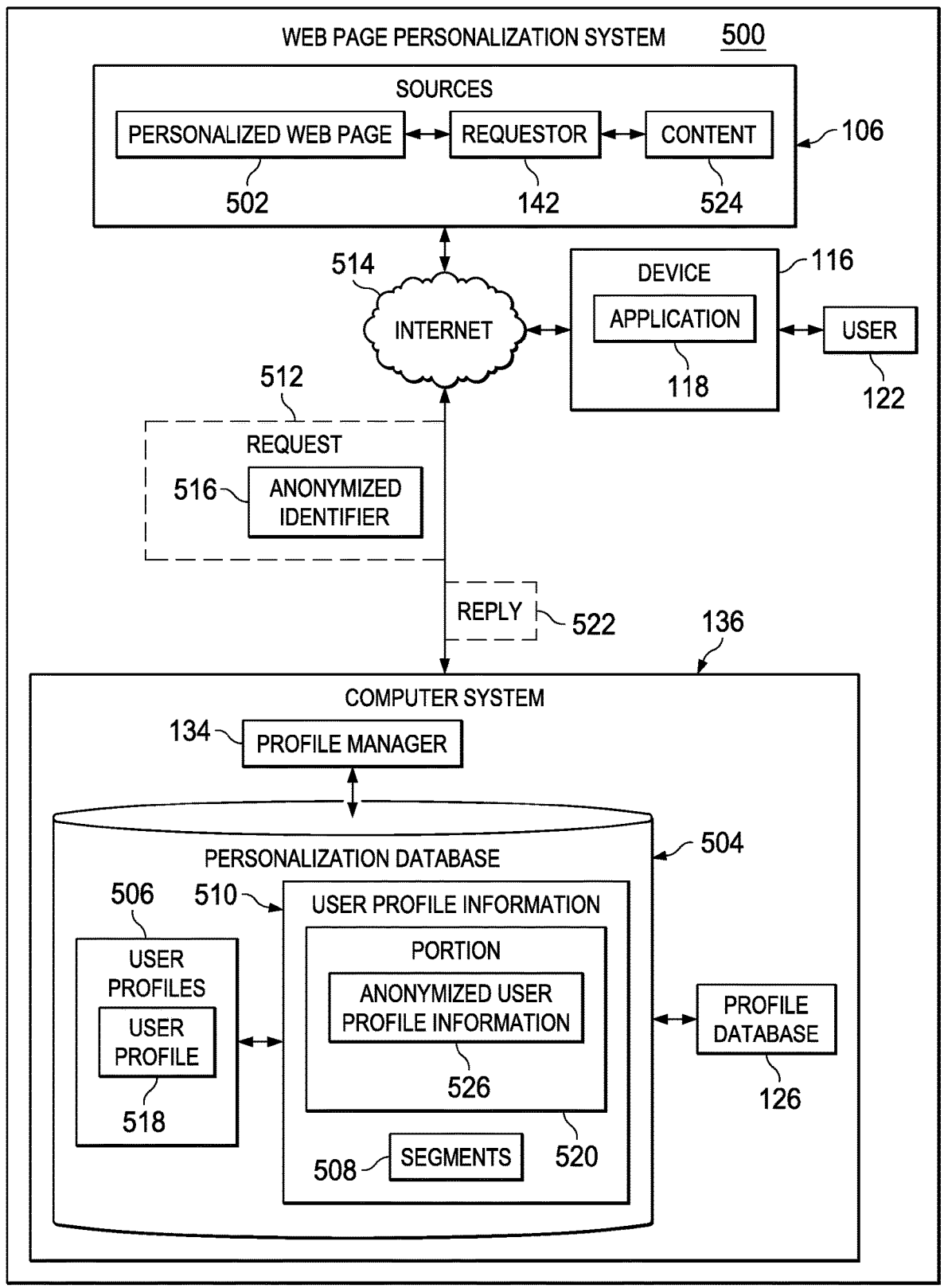
FIG. 5 is an illustration of a web page personalization system in accordance with an illustrative embodiment.

With reference to FIG. 5, an illustration of a web page personalization system is depicted in accordance with an illustrative embodiment. As depicted, web page personalization system 500 may be implemented using one or more components in information environment 100 in FIG. 1.

As depicted, web page personalization system 500 includes requestor 142 in sources 106 that generates personalized web page 502 for user 122 operating device 116. As depicted, the personalization is performed using computer system 136 which includes profile manager 134 and personalization database 504. In this illustrative example, personalization database 504 is configured to store user profiles 506 for users 102 in FIG. 1. As depicted, user profiles 506 in personalization database 504 include segments 508 of user profile information 510 about users 102.

In this illustrative example, user profile information 510 about user 122 may take other forms other than human resources profile information 128 in personalization database 126 in FIG. 1. For example, user profile information 510 about user 122 may be sales profile information, company profile information, profile information for a social site, or other types of information that may be collected to form profiles for users 102.

As depicted, profile manager 134 in computer system 136 is configured to receive request 512 over Internet 514 for a group of segments 508 of user profile information 510 about user 122 in users 102 in FIG. 1 from requestor 142 in which request 512 includes anonymized identifier 516 stored on device 116 in FIGS. 1-2 for user 122. Profile manager 134 identifies user profile 518 from user profiles 506 for user 122 in personalization database 504 using anonymized identifier 516 in which user profile 518 is comprised of segments 508 of user profile information 510 about user 122.

Profile manager 134 sends portion 520 of user profile information 510 about user 122 corresponding to the group of segments 508 requested in an anonymized form in reply 522 over Internet 514 to requestor 542. In other words, portion 520 of user profile information 510 is anonymized user profile information 526. In this manner, the identity of user 122 cannot be identified from portion 520 of user profile information 510 in the anonymized form.

Requestor 142 uses portion 520 of user profile information 510 about user 122 corresponding to the group of segments 508 in an anonymized form to generate personalized web page 502 for user 122. Requestor 142 then sends personalized web page 502 to device 116 operated by user 122 over Internet 514. Requestor 142 personalizes personalized web page 502 through a selection of content 524, a generation of content 524, or some combination thereof.

Content 524 for user 122 is based on the group of segments 508 of user profile information 510 about user 122. Content 524 in personalized web page 502 may be selected from at least one of an advertisement, an image, a video, an article, a theme, or some other suitable type of content.

In this example, user profile information 510 may also be accessed by user 122 operating application 118. For example, when user profile information 510 takes the form of human resources profile information 128 in FIG. 1, application 118 may be a human resources application. A human resources application is in the application that accesses information for employees. The access may be selected from at least one of reading, writing, deleting, or, otherwise, manipulating user profile information 510.

In this manner, profile manager 134 may provide dual purposes for user profile information 510. User profile information 510 may be accessed by user 122. Additionally, user profile information 510 also may be accessed by requestor 142. When accessed by requestor 142, profile manager 134 anonymizes user profile information 510 such that the identity of user 122 cannot be determined from anonymized user profile information 526.

In the illustrative example in FIG. 5, computer system 136 functions as a special purpose computer system and solves a technical problem with the use of resources for accessing information. In this example, profile manager 134 provides an ability to provide access to personalization database 504 as a dual purpose profile database. In the illustrative example, personalization database 504 is configured to be accessed by user 122 operating application 118 in FIGS. 1-2 to access profile information 510.

Additionally, profile manager 134 is configured to provide access to user profile information 510 to requestor 142 for purposes such as personalizing web pages or other content for user 122 or other users in users 102 in FIG. 1. Portion 520 of user profile information 510 is modified to form anonymized user profile information 526 such that the identity of user 122 cannot be determined using anonymized user profile information 526.

Thus, computer system 136 with user profile information 510 has a dual purpose. As a result, the amount of resources needed to provide information for different purposes is reduced. In this manner, a technical solution is provided to a technical problem with usage of resources that is greater than desired.

The illustration of information environment 100 and the different components in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although requestor 142 in FIG. 1 is shown as being part of sources 106 in FIG. 1, requestor 142 may be a separate component from sources 106. For example, requestor 142 may be a server or other hardware system that provides an interface between sources 106 and profile manager 134 in computer system 136 in FIG. 1. As another example, requestor 142 is shown as communicating directly with computer system 136 in FIG. 1. The exchange of request 138 and reply 150 may be routed through network 110 in FIG. 1. Requestor 142 may take various forms such as an advertisement server, a website server, or some other suitable type of hardware device or computer that may generate request 138.

As another example, other types of user profile information 120 may be included in addition to human resources profile information 128 and personalization database 126 in FIG. 1. For example, user profile information 120 may include information obtained from tracking the activities of users 102. For example, websites visited, videos downloaded, items viewed, items purchased, and other activities of users 102 may be identified to include additional information in user profile information 120 in addition to human resources profile information 128.

For example, applications 112 in FIG. 1 may also gather information for use in human resources profile information 128 or other types of user profile information 120 as an extension to the other functions of applications 112. For example, applications 112 also may track activities of users 102 as they request or search for information 104. For example, applications 112 may track websites visited, web pages downloaded, items selected on web pages, and other activities of users 102 as an extension to the normal function of applications 112.

Figure 6:
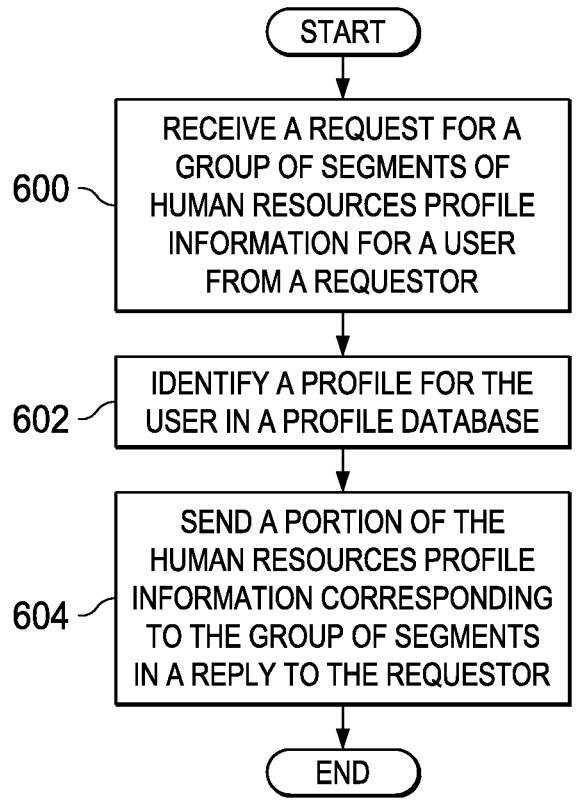
FIG. 6 is a flowchart of a process for managing human resources profile information in accordance with an illustrative embodiment.

Turning next to FIG. 6, a flowchart of a process for managing human resources profile information is depicted in accordance with an illustrative embodiment. The process illustrated in FIG. 6 may be implemented in profile manager 134 in FIG. 1. The different steps may be embodied as program code for profile manager 134 in FIG. 1.

The process begins by receiving a request for a group of segments of human resources profile information for a user from a requestor (step 600). The process identifies a profile for the user in a profile database (step 602). The profile is comprised of the segments of the human resources profile information about the user. In other words, each segment in the profile includes information about the user that has been categorized as belonging to a segment.

The process sends a portion of the human resources profile information corresponding to the group of segments in a reply to the requestor (step 604). In step 604, some or all of human resources profile information for the user are in the portion. In this manner, the requestor may generate an advertisement for inclusion in information sent to the user. For example, the requestor may place the advertisement in a web page or other content that is sent to an application running on a device for the user.

When the group of segments in the request is less than all of the human resources profile information for the user, fewer resources are used to transmit the information over a network. For example, processor resources, bandwidth in a network, or other resources used in transmitting the information may be reduced. When a very large number of requests and replies are sent, bottlenecks, delays, and other undesired effects in the network may be reduced or avoided.

Figure 7:
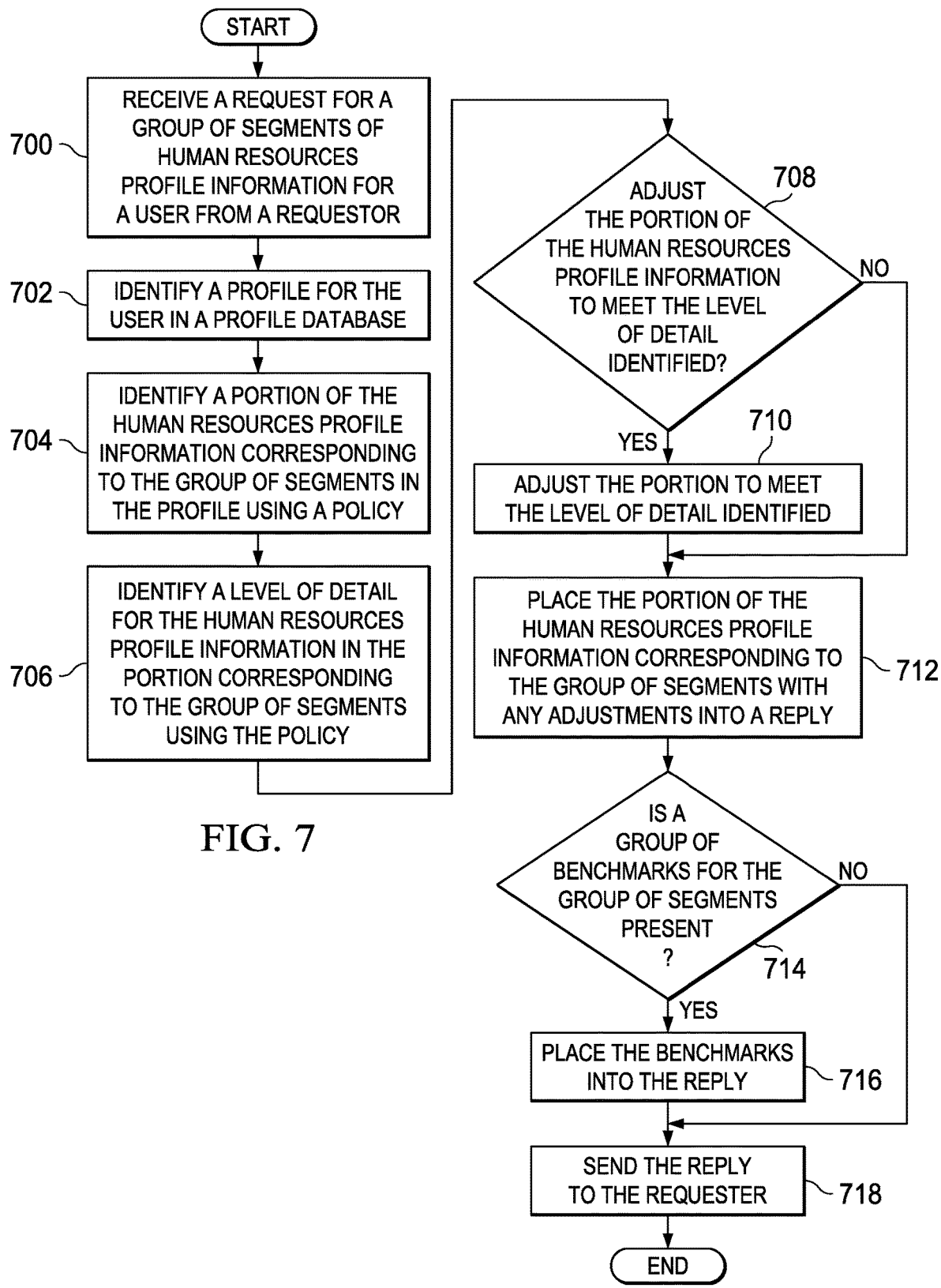
FIG. 7 is a flowchart of a process for identifying human resources profile information using a policy in accordance with an illustrative embodiment.

With reference now to FIG. 7, a flowchart of a process for identifying human resources profile information using a policy is depicted in accordance with an illustrative embodiment. The process illustrated in FIG. 7 may be implemented in profile manager 134 in FIG. 1. The different steps may be embodied as program code for profile manager 134 in FIG. 1.

The process begins by receiving a request for a group of segments of human resources profile information for a user from a requestor (step 700). The process identifies a profile for the user in a profile database (step 702). The process identifies a portion of the human resources profile information corresponding to the group of segments in the profile using a policy (step 704).

The process identifies a level of detail for the human resources profile information in the portion corresponding to the group of segments using the policy (step 706). A determination is made as to whether to adjust the portion of the human resources profile information to meet the level of detail identified (step 708). If the portion of the human resources profile information needs to be adjusted, the process adjusts the portion to meet the level of detail identified (step 710). This adjustment may include at least one of generalizing information, removing information, creating ranges of values, or other suitable adjustments.

For example, if a salary is requested in a segment, the level of detail identified may be a salary range when the policy is applied. As a result, the portion of the human resources profile information identifying the salary may be changed to a range of salaries to perform the adjustment.

The process places the portion of the human resources profile information corresponding to the group of segments with any adjustments into a reply (step 712).

The process also determines whether a group benchmarks for the group of segments are present (step 714). In step 714, one or more of the segments may have one or more benchmarks. If a group of benchmarks is present, the process places the benchmarks into the reply (step 716).

The process sends the reply to the requestor (step 718) with the process terminating thereafter. With reference again to step 708, if the portion of the human resources profile information does not need to be adjusted, the process proceeds directly to step 712 as described above. Turning back to step 714, if a group of benchmarks is not present, the process proceeds to step 718 as described above.

Figure 8:
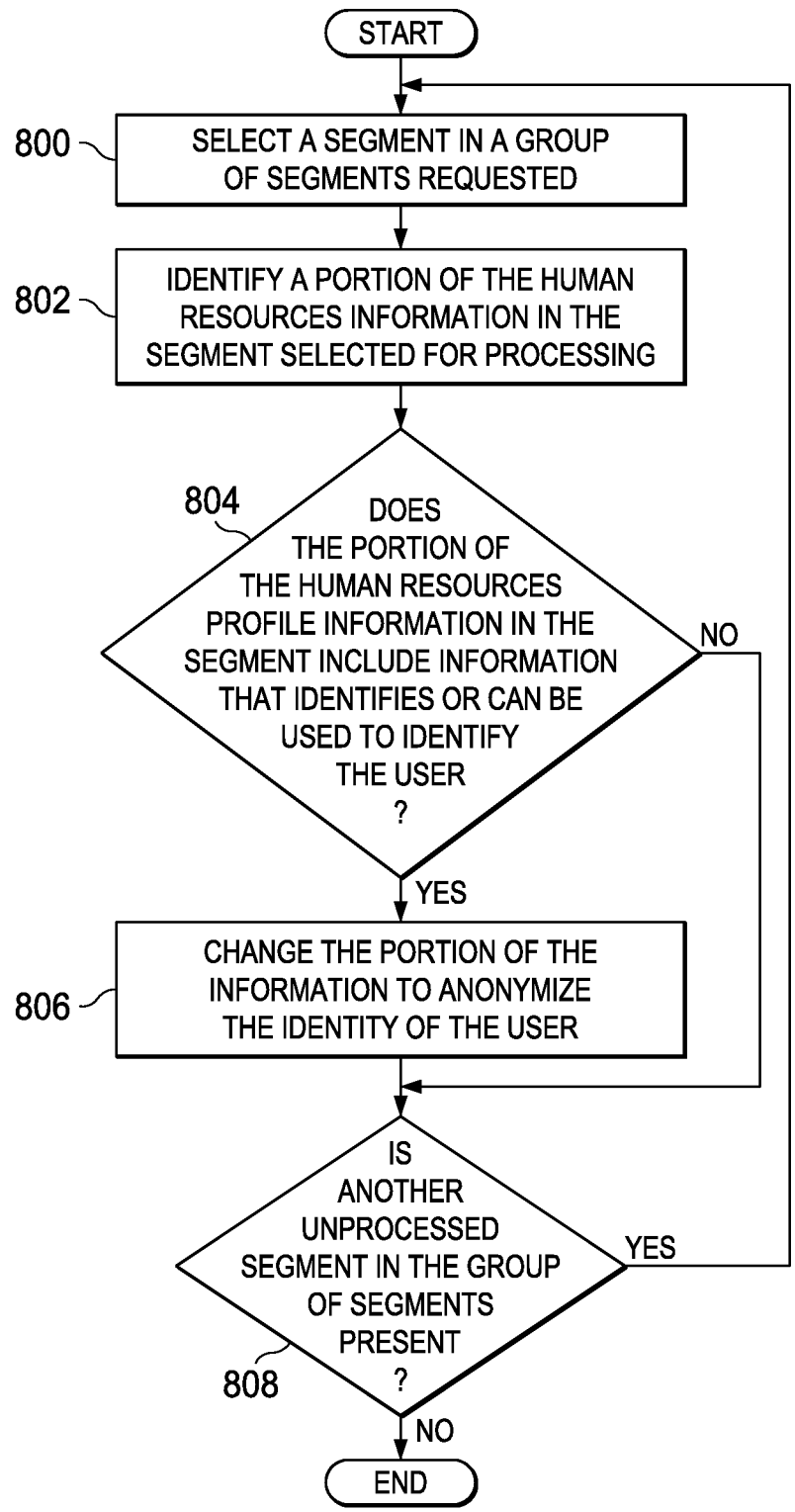
FIG. 8 is a flowchart of a process for anonymizing human resources profile information in accordance with an illustrative embodiment.

Turning now to FIG. 8, a flowchart of a process for anonymizing human resources profile information is depicted in accordance with an illustrative embodiment. The process in FIG. 8 may be implemented in profile manager 134 in FIG. 1. The different steps may be embodied as program code that implements one or more rules in the policy that is applied by profile manager 134.

This process is implemented using a policy with rules that anonymize human resources profile information to avoid allowing other parties to ascertain an identity of a user from a portion of the anonymizing human resources profile information that is returned in the reply. In this example, the process is applied after the portion of the human resources profile information corresponding to a group of segments requested has been identified.

The process selects a segment in a group of segments requested (step 800). The process identifies a portion of the human resources profile information in a segment selected for processing (step 802).

A determination is made as to whether the portion of the human resources profile information in the segment include information that identifies or can be used to identify the user (step 804). In step 804, the process applies a policy that includes one or more rules for anonymizing information about the user. For example, the rule may state that names, addresses, social security numbers, or other information is not allowed to be sent.

If the portion of the human resources profile information in the segment includes information that identifies or can be used to identify the user, the process changes the portion of the information to anonymize the identify the user (step 806). Step 806 may include removing the information, generalizing the information, or otherwise changing the information such that the user cannot be identified.

A determination is made as to whether another unprocessed segment in the group of segments is present (step 808). If another unprocessed segment in the group of segments is present, the process returns to step 800). Otherwise, the process terminates. With reference again to step 804, if the portion of the human resources profile information in the segment does not include information that identifies or can be used to identify the user, the process also proceeds to step 808.

Figure 9:
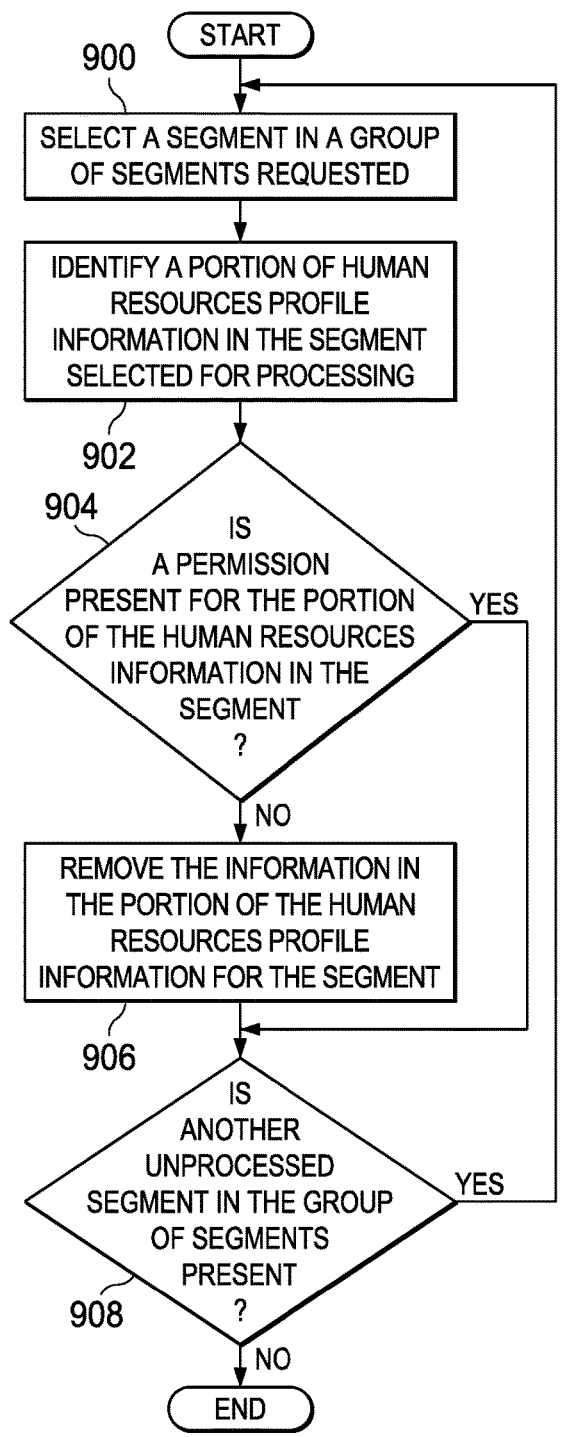
FIG. 9 is a flowchart of a process for processing permissions in accordance with an illustrative embodiment.

Turning to FIG. 9, a flowchart of a process for processing permissions is depicted in accordance with an illustrative embodiment. The process illustrated in FIG. 9 may be implemented in profile manager 134 in FIG. 1 and is an example of one manner in which a policy may be used in identifying a portion of human resources profile information to return in a reply. The different steps may be embodied as program code that implements one or more rules in the policy that is applied by profile manager 134.

The process selects a segment in a group of segments requested (step 900). The process identifies a portion of human resources profile information in the segment selected for processing (step 902).

A determination is made as to whether a permission is present for the portion of the human resources profile information in the segment (step 904). In step 904, the policy may include a rule as to whether the requestor has the permission for the segment.

For example, the permission may be based on whether the request has paid a fee or is willing to pay a fee for the information in the segment. The requestor may have the permissions to some of the segments and not others in the group of segments. As a result, the fee paid by the requestor may depend on how many of the segments are requested.

As another example, the policy may also include a rule as to whether the user has given the permission for the information in the segment to be returned in a reply. For example, the user may provide the permission for one or more of the segments in exchange for the fee.

If the permission is not present, the information in the portion of the human resources profile information for the segment is removed (step 906). A determination is made as to whether another unprocessed segment in the group of segments is present (step 908). If another unprocessed segment in the group of segments is present, the process returns to step 900. Otherwise, the process terminates. With reference again to step 904, if the permission is present, the process proceeds to step 908.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, steps 714 and 716 in FIG. 7 are optional steps. Benchmarks are not necessary in all examples.

Figure 10:
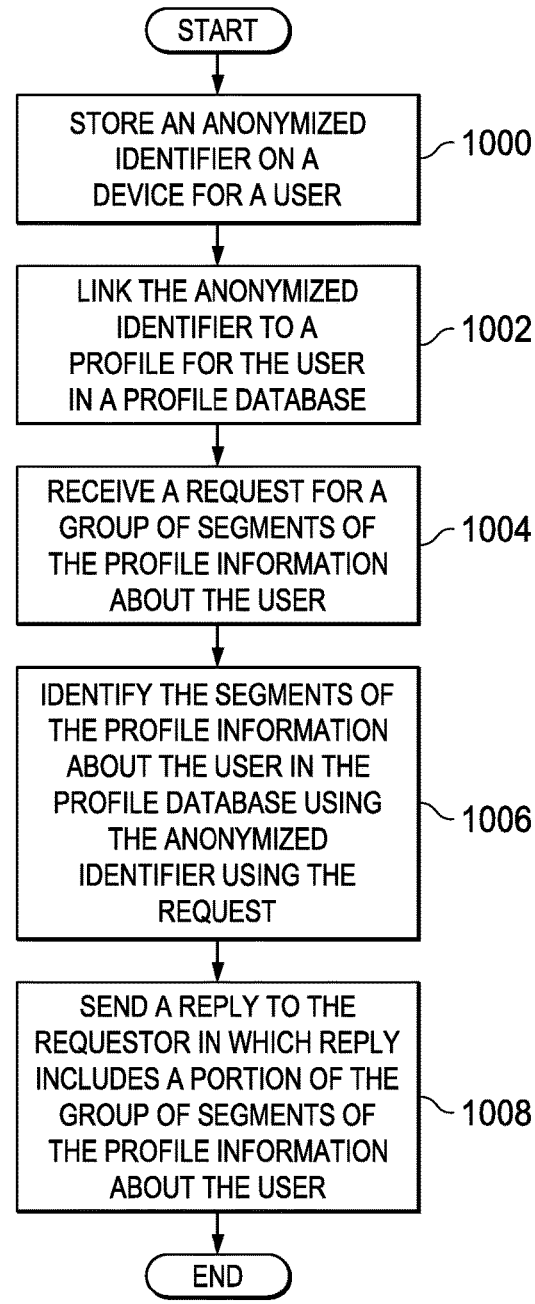
FIG. 10 is an illustration of a flowchart of a process for personalizing a web page in accordance with an illustrative embodiment.

With reference now to FIG. 10, an illustration of a flowchart of a process for personalizing a web page is depicted in accordance with an illustrative embodiment. The process illustrated in FIG. 10 may be implemented in information environment 100 to generate personalized webpage 502. The steps illustrated in this flowchart may be implemented in profile manager 134 as shown in FIG. 1.

The process begins by storing an anonymized identifier on a device for a user (step 1000). This anonymized identifier may take different forms. For example, the anonymized identifier may be a cookie, a serial number for a processor, a media access control (MAC) address, or some other suitable type of identifier. The anonymized identifier is selected such that the identity of the user cannot be determined by looking at the anonymized identifier.

The process links the anonymized identifier to a profile for the user in a profile database (step 1002). The linking may be performed in a number of different ways. For example, the anonymized identifiers may be used as keys in the profile database. The linking may be performed using a table that indexes the anonymized identifiers to users in the profile database. The profile is comprised of segments of profile information about the user.

Next, the process receives a request for a group of segments of the profile information about the user (step 1004). The process then identifies the segments of the profile information about the user in the profile database using the anonymized identifier using the request (step 1006).

Afterwards, the process sends a reply to the requestor in which reply includes a portion of the group of segments of the profile information about the user (step 1008) with the process terminating thereafter. In step 1008, the portion of the segments may be some or all of the group of segments. For example, not all of the group of segments of profile information about the users may be sent depending on the requester. The requester may have requested more than allowed. For example, the requester may have paid for only some of the segments and not others.

In another example, the portion of the group of segments may include only some of the information in a particular segment. For example, the profile information may include more details than desired to provide anonymity for the user. In this case, the profile information may be modified to anonymize the identity of the user. The restriction on how much information is included in the portion also may be based on permissions from the user.

Figure 11:
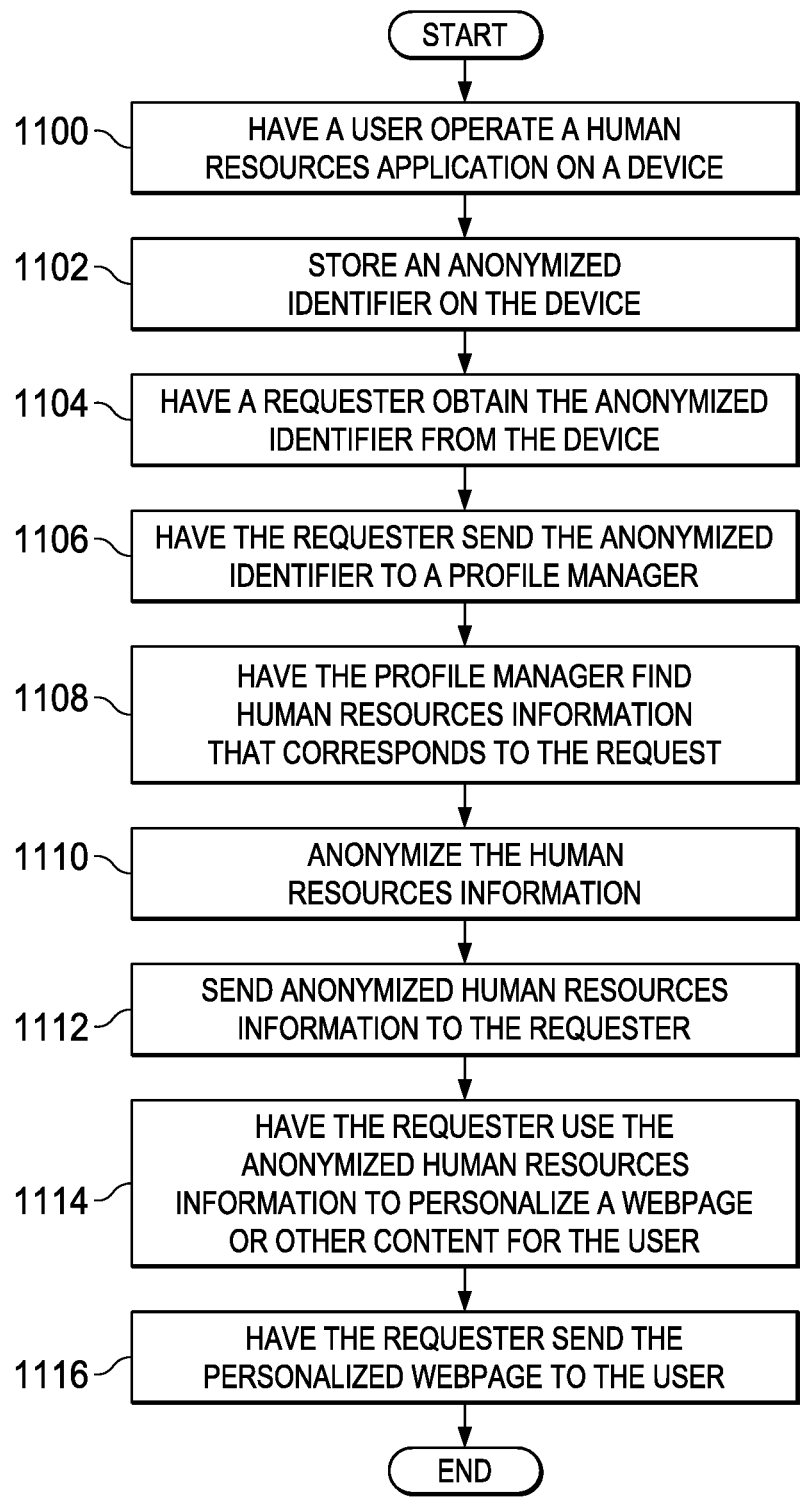
FIG. 11 is an illustration of a flowchart of a process for personalizing a web page using human resources profile information in accordance with an illustrative embodiment.

Turning next to FIG. 11, an illustration of a flowchart of a process for personalizing a web page using human resources profile information is depicted in accordance with an illustrative embodiment. The process illustrated in FIG. 11 describes steps that may be performed by different components in information environment 100 in FIG. 1.

The process begins by having a user operate a human resources application on a device (step 1100). The human resources application is an application relating to people in organizations such as employees for a company. The human resources application may be, for example, a payroll application, a benefits application, an expense application, a retirement application, or some other suitable type of application.

Next, the process stores an anonymized identifier on the device (step 1102). The storage of the anonymized identifier may be performed by the application, a profile manager, or some other suitable component. The anonymized identifier may be, for example, a cookie, an anonymized identifier for the mobile device, or some other suitable identifier.

The process then has a requester obtain the anonymized identifier from the device (step 1104). The requester may contain this anonymized identifier as part of a transaction performed between the device and the requester. For example, the user may visit the website and the requester may be a website server that requests the anonymized identifier. Afterwards, the process has the requester send the anonymized identifier to a profile manager (step 1106). The profile manager manages access to a profile database.

The process then has the profile manager find human resources information that corresponds to the request (step 1108). This human resources information is anonymized (step 1110). Step 1110 is performed by the profile manager to place the human resource information into a form that may be used by the requester while protecting the privacy of the user. In this illustrative example, the form is one such that the user cannot be identified from the human resources profile information about the user. Next, the process sends anonymized human resources information to the requester (step 1112). The process then has the requester use the anonymized human resources information to personalize a web page or other content for the user (step 1114). Afterwards, the process has the requester send the personalized webpage to the user (step 1116) with the process terminating thereafter.

In this manner, the human resources data used for human resources purposes may be transformed into a form for use in personalizing web pages. In this manner, the personalization of the web pages may be formed with more detailed information about the users that is not normally found. In these illustrative examples, the human resources profile information is anonymized such that the identity of the users cannot be determined from the anonymized human resources profile information. Further, with the dual use, the amount of the resources needed to provide access to information for these two purposes is reduced by not requiring to have two databases to provide access to the information.

Figure 12:
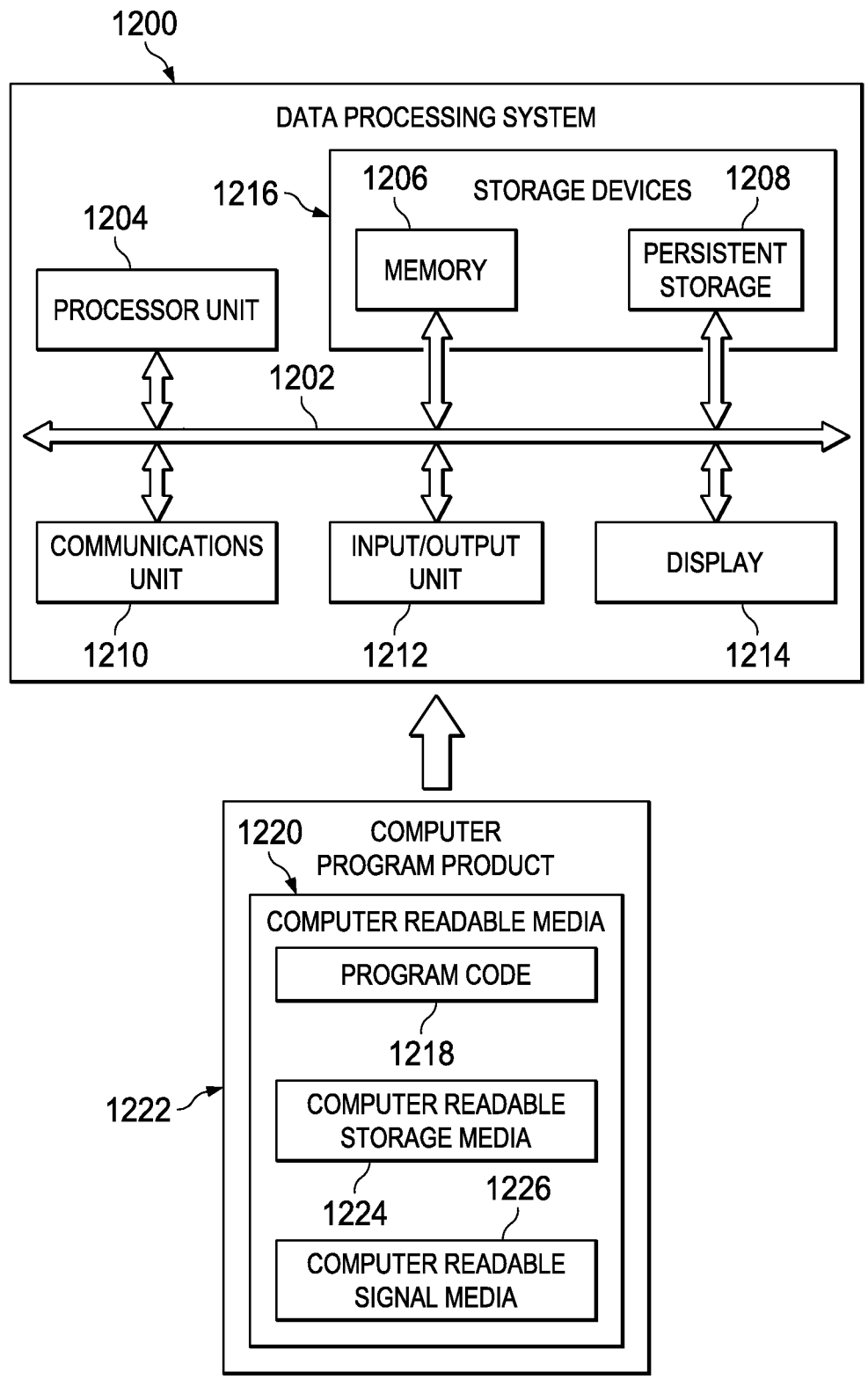
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 136, sources 106, and devices 108 in FIG. 1. In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, the different illustrative examples provide a method and apparatus for managing advertisements. In one illustrative example, human resources profile information is used to provide information for generating the advertisements. The human resources profile information identifies users. A profile manager anonymizes the human resources profile information as needed. The anonymization may be performed by applying a policy. The policy may generalize the information, omit the information, place the information into ranges, or in some other suitable manner to protect the privacy of the user.

Further, the list of examples also allows for the human resources profile information to be requested in segments. The use of the segments returns only the information that an advertiser is interested in for use in generating the advertisements.

As a result, less than all of the available human resources profile information for the user is returned to a requestor for use in generating an advertisement. In this manner, less information is sent enabling a reduction in delays, bottlenecks, or other undesired effects that may occur when sending large amounts of the information over a network.

Further, a profile manager may allow more uses for the human resources profile information that is normally used only for human resource operations such as those for payroll, health insurance, and benefits. With the profile manager, the human resources profile information may be used for other purposes such as supplying information for advertising. As a result, a profile database with the human resources profile information may have a dual function. This dual function reduces a time and effort needed to create a new database. Also, the amount of storage space in a computer system is reduced with this dual function.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. For example, although the illustrative examples have been described with respect to supplying human resources profile information for generating advertising, other illustrative examples may be applied to personalizing web pages generated by web servers. In this manner, the different steps illustrated may be used to provide web pages to users that are more personalized. Web pages may be modified or dynamically generated using the human resources profile information.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing profile information, the method comprising:
   identifying, by a computer system, information about a user from an application on a device used by the user;
   storing, by the computer system, the information and a hardware-based identifier of the device in a profile for the user on a user profile database;
   generating, by the computer system, an anonymized identifier that includes the hardware-based identifier;
   sending, by the computer system, the anonymized identifier to the device;
   receiving, by a computer system, a request for user profile information related to a group of segments in the request from a requestor, wherein the request includes the anonymized identifier;
   querying, by the computer system, the user profile database, based on the hardware-based identifier received in the anonymized identifier, to identify the user profile information about the user;
   identifying, by the computer system, benchmark information comprising a group of benchmarks for the group of segments as part of human resources profile information corresponding to the group of segments; and
   sending, by the computer system, a portion of the user profile information corresponding to the group of segments in a reply to the requestor, wherein the group of benchmarks is placed into the reply,
   wherein the group of segments in the request is less than all of the human resources profile information for the user so that fewer resources are used to transmit the information over a network.

2. The method of claim 1, wherein the application is selected from one of a payroll application and a benefits application.

3. The method of claim 1 further comprising:
   identifying, by the computer system, the portion of the user profile information corresponding to the group of segments using a policy.

4. The method of claim 3 further comprising:
   identifying, by the computer system, a level of detail for the user profile information in the portion corresponding to the group of segments using the policy.

5. The method of claim 1, wherein a plurality of benchmarks are identified for each segment in the group of segments.

6. The method of claim 1 further comprising:
   identifying, by the computer system, the user profile information based on permissions from the user.

7. The method of claim 1, wherein the requestor is selected from one of a web server and an advertisement distribution server.

8. The method of claim 1, wherein the request includes the anonymized identifier for the user.

9. The method of claim 1, wherein a segment in the group of segments is selected from one of a work location, a residence location, an age group, a gender, a title, an industry, a hobby, a type of insurance, and a salary.

10. A web page personalization system comprising:
    a profile database configured to store profiles for users, wherein the profiles are comprised of segments of profile information for the users; and
    a profile manager configured to identify information about a user from an application on a device used by the user; store the information and a hardware-based identifier of the device in a profile for the user on a user profile database; generate an anonymized identifier that includes the hardware-based identifier; send the anonymized identifier to the device; receive a request over an Internet for a group of segments of profile information about a user in the users from a requestor in which the request includes an anonymized identifier stored on a device for the user; query the user profile database using the hardware-based identifier received in the anonymized identifier to identify the profile information about the user; identify benchmark information comprising a group of benchmarks for the group of segments as part of human resources profile information corresponding to the group of segments; and send a portion of the profile information about the user corresponding to the group of segments in an anonymized form in a reply over the Internet to the requestor, wherein the group of benchmarks is placed into the reply, wherein the requestor uses the group of segments to generate a personalized web page for the user,
    wherein the group of segments in the request is less than all of the human resources profile information for the user so that fewer resources are used to transmit the information over a network.

11. The web page personalization system of claim 10, wherein the requestor is configured to obtain the anonymized identifier from the device and generate the personalized web page for the user from the group of segments of the profile information about the user; and send the personalized web page to the device over the Internet.

12. The web page personalization system of claim 11, wherein the requestor is selected from one of a website server and an advertising server.

13. The web page personalization system of claim 10, wherein the personalized web page includes content selected for the user based on the portion of the profile information about the user corresponding to the group of segments in the anonymized form.

14. The web page personalization system of claim 13, wherein the content is selected from at least one of an advertisement, an image, a video, or an article.

15. The web page personalization system of claim 10, wherein the profile information about the user is human resources profile information.

16. The web page personalization system of claim 10, wherein a human resource application is located on the device used by the user and is used to access human resources profile information in the user profile database.

17. A method for personalizing a web page, the method comprising:
   identifying, by a computer system, information about a user from an application on a device used by the user;
   linking, by the computer system, a hardware-based identifier of a device used by the user to a profile for the user in a profile database, wherein the profile is comprised of segments of profile information about the user;
   generating, by the computer system, an anonymized identifier that includes the hardware-based identifier;
   sending, by the computer system, the anonymized identifier to the device;
   receiving, by the computer system, a request for a group of the segments of the profile information about the user, wherein the request includes the anonymized identifier;
   querying, by the computer system, the user profile database, based on the hardware-based identifier received in the anonymized identifier, to identify the user profile information about the user;
   identifying, by the computer system, benchmark information comprising a group of benchmarks for a group of segments as part of human resources profile information corresponding to the group of segments; and
   sending, by the computer system, a reply to a requestor in which the reply includes a portion of the segments of the profile information about the user in a form of anonymized profile information, wherein the group of benchmarks is placed into the reply,
   wherein the group of segments in the request is less than all of the human resources profile information for the user so that fewer resources are used to transmit the information over a network.

18. The method of claim 17, wherein the requestor obtains the anonymized identifier from the device and generates a personalized web page for the user from the portion of the group of segments of the profile information about the user; and sends the personalized web page to the device over an Internet.

19. The method of claim 18, wherein the requestor is selected from one of a website server and an advertising server.

20. The method of claim 17, wherein a personalized web page includes content selected for the user based on the group of segments of the profile information about the user.

21. The method of claim 20, wherein the content is selected from at least one of an advertisement, an image, a video, or an article.

22. The method of claim 17, wherein the profile information is human resources profile information.

23. The method of claim 17, wherein a human resource application is located on the device for the user and is used to access human resources profile information in the profile database.

24. A method for managing human resources profile information, the method comprising:
   identifying, by a computer system, information about a user from an application on a device used by the user;
   storing, by the computer system, the information and a hardware-based identifier of the device in a profile for the user on a user profile database;
   generating, by the computer system, an anonymized identifier that includes the hardware-based identifier;
   sending, by the computer system, the anonymized identifier to the device;
   receiving, by a computer system, a request for a group of segments of the human resources profile information for a user from a requestor, wherein the request includes the anonymized identifier;
   querying, by the computer system, the profile database, based on the hardware-based identifier received in the anonymized identifier, to identify the user profile information about the user, wherein the profile is comprised of the group of segments of the human resources profile information about the user;
   identifying, by the computer system, benchmark information comprising a group of benchmarks for the group of segments as part of human resources profile information corresponding to the group of segments; and
   sending, by the computer system, a portion of the human resources profile information corresponding to the group of segments in a reply to the requestor, wherein the group of benchmarks is placed into the reply,
   wherein the group of segments in the request is less than all of the human resources profile information for the user so that fewer resources are used to transmit the information over a network.

25. The method of claim 24, wherein the application is selected from one of a payroll application and a benefits application.

26. The method of claim 24 further comprising:
   identifying, by the computer system, the portion of the human resources profile information corresponding to the group of segments using a policy.

27. The method of claim 26 further comprising:
   identifying, by the computer system, a level of detail for the human resources profile information in the portion corresponding to the group of segments using the policy.

28. The method of claim 24, wherein a plurality of benchmarks are identified for each segment in the group of segments.

29. The method of claim 24 further comprising:
   identifying, by the computer system, the human resources profile information based on permissions from the user.

30. The method of claim 24, wherein the requestor is selected from one of a web server and an advertisement distribution server.

31. The method of claim 24, wherein the request includes a unique identifier for the user.

32. The method of claim 24, wherein a segment in the segments is selected from one of a work location, a residence location, an age group, a gender, a title, an industry, a hobby, a type of insurance, and a salary.

33. An advertising system comprising:
a profile database configured to store human resource profiles for users, wherein the human resource profiles are segmented; and
a profile manager configured to identify information about a user from an application on a device used by the user; store the information and a hardware-based identifier of the device in a profile for the user on a user profile database; generate an anonymized identifier that includes the hardware-based identifier; send the anonymized identifier to the device; receive a request for a group of segments of human resources profile information for a user from a requestor, wherein the request includes the anonymized identifier; query the user profile database using the hardware-based identifier received in the anonymized identifier to identify the profile information about the user, wherein the profile is comprised of the segments of the human resources profile information about the user; identify benchmark information comprising a group of benchmarks for the group of segments as part of human resources profile information corresponding to the group of segments; and send a portion of the human resources profile information corresponding to the group of segments in a reply to the requestor, wherein the group of benchmarks is placed into the reply,
wherein the group of segments in the request is less than all of the human resources profile information for the user so that fewer resources are used to transmit the information over a network.

34. The advertising system of claim 33 further comprising:
an advertising server that selects an advertisement using the portion of the human resources profile information corresponding to the group of segments in the reply.

35. The advertising system of claim 34 further comprising:
a web server configured to send a web page to the user, wherein the web page includes the advertisement selected by the advertising server.

36. The advertising system of claim 33, wherein the profile manager identifies the portion of the human resources profile information corresponding to the group of segments using a policy.

37. The advertising system of claim 36, wherein the profile manager identifies a level of detail for the human resources profile information in the portion corresponding to the group of segments using the policy.

38. The advertising system of claim 33, wherein a plurality of benchmarks are identified for each segment in the group of segments.

39. The advertising system of claim 33, wherein the profile manager identifies the human resources profile information based on permissions from the user.

40. The advertising system of claim 33, wherein the requestor is selected from one of a web server and an advertisement distribution server.

41. The advertising system of claim 33, wherein the request includes a unique identifier for the user.

42. The advertising system of claim 33, wherein a segment in the segments is selected from one of a work location, a residence location, an age group, a gender, a title, an industry, a hobby, a type of insurance, and a salary.

43. A non-transitory computer readable storage media for managing human resources profile information, the non-transitory computer readable storage media comprising:
a computer-readable storage media;
program code, stored on the computer-readable storage media, for identifying information about a user from an application on a device used by the user;
program code, stored on the computer-readable storage media, for storing the information and a hardware-based identifier of the device in a profile for the user on a user profile database;
program code, stored on the computer-readable storage media, for generating an anonymized identifier that includes the hardware-based identifier;
program code, stored on the computer-readable storage media, for sending the anonymized identifier to the device;
program code, stored on the computer-readable storage media, for receiving a request for a group of segments of the human resources profile information for a user from a requestor, wherein the request includes the anonymized identifier;
program code, stored on the computer-readable storage media, for querying a profile database using the hardware-based identifier received in the anonymized identifier to identify the human resources profile information about the user, wherein the profile is comprised of the segments of the human resources profile information about the user;
program code, stored on the computer-readable storage media, for identifying benchmark information comprising a group of benchmarks for the group of segments as part of human resources profile information corresponding to the group of segments;
program code, stored on the computer-readable storage media, for sending a portion of the human resources profile information corresponding to the group of segments in a reply to the requestor, wherein the group of benchmarks is placed into the reply; and
program code, stored on the computer-readable storage media, for identifying the portion of the human resources profile information corresponding to the group of segments using a policy,
wherein the group of segments in the request is less than all of the human resources profile information for the user so that fewer resources are used to transmit the information over a network.

44. The non-transitory computer readable storage media of claim 43 further comprising:
program code, stored on the computer-readable storage media, for identifying a level of detail for the human resources profile information in the portion corresponding to the group of segments using the policy.

45. The non-transitory computer readable storage media of claim 43, wherein a plurality of benchmarks are identified for each segment in the group of segments.

46. An advertising system comprising:
a profile database configured to store profiles for users, wherein the profiles are segmented; and
a profile manager configured to identify information about a user from an application on a device used by the user; store the information and a hardware-based identifier of the device in a profile for the user on a user profile database; generate an anonymized identifier that includes the hardware-based identifier; send the anonymized identifier to the device; receive a request for a group of segments of profile information for a user from a requestor, wherein the request includes the anonymized identifier; query the user profile database based on the hardware-based identifier received in the anonymized identifier, to identify the user profile information about the user, wherein the profile is comprised of the segments of information about the user; identify benchmark information comprising a group of benchmarks for the group of segments as part of human resources profile information corresponding to the group of segments; and send a portion of the information corresponding to the group of segments in a reply to the requestor, wherein the group of benchmarks is placed into the reply, wherein the group of segments in the request is less than all of the human resources profile information for the user so that fewer resources are used to transmit the information over a network.

\* \* \* \* \*